United States Patent
Kenny et al.

(10) Patent No.: US 12,517,010 B2
(45) Date of Patent: Jan. 6, 2026

(54) FAULT DETECTION TECHNIQUE FOR A BEARING

(71) Applicants: Deere & Company, Moline, IL (US); Iowa State University Research Foundation, Inc., Ames, IA (US)

(72) Inventors: Shawn A. Kenny, Ames, IA (US); Jeffrey S. Sidon, Des Moines, IA (US); Sriram Krishnaswamy, Plano, TX (US); Mohammad Kazem Sadoughi, Houston, TX (US); Hao Lu, Ames, IA (US); Chao Hu, Ames, IA (US)

(73) Assignees: Deere & Company, Moline, IL (US); Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 17/235,419

(22) Filed: Apr. 20, 2021

(65) Prior Publication Data

US 2021/0356361 A1    Nov. 18, 2021

Related U.S. Application Data

(60) Provisional application No. 63/025,565, filed on May 15, 2020.

(51) Int. Cl.
*G01M 13/045* (2019.01)
*F16C 19/52* (2006.01)
*G06N 3/04* (2023.01)
*G06N 3/08* (2023.01)

(52) U.S. Cl.
CPC ......... *G01M 13/045* (2013.01); *F16C 19/527* (2013.01); *G06N 3/04* (2013.01); *G06N 3/08* (2013.01); *F16C 2233/00* (2013.01)

(58) Field of Classification Search
CPC . G01M 13/045; F16C 19/527; F16C 2233/00; G06N 3/04; G06N 3/08
See application file for complete search history.

(56) References Cited

U.S. PATENT DOCUMENTS

| | | | |
|---|---|---|---|
| 5,188,095 A * | 2/1993 | Healy | A61H 1/005 601/78 |
| 5,383,133 A * | 1/1995 | Staple | G01H 1/00 340/963 |
| 6,370,957 B1 | 4/2002 | Filippenko et al. | |
| 6,496,782 B1 | 12/2002 | Claus et al. | |
| 7,559,240 B2 | 7/2009 | Iwatsubo et al. | |
| 7,606,673 B2 | 10/2009 | Judd et al. | |

(Continued)

OTHER PUBLICATIONS

Boukari et al., 2018, "A Parallel Multi-Classifiers System for Mechanical Fault Recognition" In 2018 International Symposium on Advanced Electrical and Communication Technologies (ISAECT), pp. 1-6. IEEE, 2018 (Year: 2018).*

(Continued)

*Primary Examiner* — Lina Cordero
*Assistant Examiner* — Lyudmila Zaykova-Feldman
(74) *Attorney, Agent, or Firm* — Tucker Ellis LLP

(57) ABSTRACT

Systems and methods are provided for fault detection in a component of a machine during operation. Vibration data is acquired based on a vibration signal output from a sensor associated with the component. The vibration data is analyzed with at least two machine learning models to predict a condition of the component.

17 Claims, 8 Drawing Sheets

(56) References Cited

U.S. PATENT DOCUMENTS

| | | | |
|---|---|---|---|
| 9,157,832 B2 | 10/2015 | Uluyol et al. | |
| 9,618,037 B2 | 4/2017 | Kar et al. | |
| 9,824,060 B2 | 11/2017 | Yacout et al. | |
| 9,989,439 B2 | 6/2018 | Thomson et al. | |
| 11,242,051 B1* | 2/2022 | Konrardy | G08G 1/096725 |
| 2002/0198961 A1* | 12/2002 | Krishnamurthy | H04L 9/40 707/E17.119 |
| 2008/0048603 A1* | 2/2008 | Discenzo | H02P 29/032 318/609 |
| 2009/0048050 A1* | 2/2009 | Kamada | B60W 10/10 701/53 |
| 2011/0224865 A1* | 9/2011 | Gordon | G07C 5/085 701/29.6 |
| 2012/0126738 A1* | 5/2012 | Li | H02P 29/0241 318/490 |
| 2012/0283963 A1* | 11/2012 | Mitchell | F01D 21/003 702/34 |
| 2013/0013138 A1* | 1/2013 | Lu | B60L 3/0061 702/34 |
| 2013/0229272 A1* | 9/2013 | Elliott | G05G 9/047 74/471 XY |
| 2014/0039809 A1 | 2/2014 | Girondin et al. | |
| 2014/0074345 A1* | 3/2014 | Gabay | G07C 5/008 701/33.9 |
| 2014/0116124 A1* | 5/2014 | Ma | G01M 15/14 73/112.01 |
| 2015/0254285 A1* | 9/2015 | Achar | G06F 16/278 707/692 |
| 2015/0308926 A1* | 10/2015 | Koumura | G01M 7/02 702/56 |
| 2017/0023634 A1* | 1/2017 | Takehara | G01R 31/2642 |
| 2017/0076514 A1* | 3/2017 | Valeri | G05B 23/00 |
| 2017/0122838 A1* | 5/2017 | Ko | G01M 13/04 |
| 2017/0308802 A1* | 10/2017 | Ramsøy | G06N 20/00 |
| 2018/0121793 A1* | 5/2018 | Bhandary | G05B 23/0254 |
| 2019/0033171 A1* | 1/2019 | Zhang | F02D 41/22 |
| 2019/0095781 A1* | 3/2019 | Vedula | G01H 17/00 |
| 2019/0101891 A1 | 4/2019 | Iijima et al. | |
| 2019/0107824 A1* | 4/2019 | Oohara | G05B 19/4065 |
| 2019/0152744 A1* | 5/2019 | Kusserow | B66B 25/006 |
| 2020/0003736 A1* | 1/2020 | Bittner | G01N 29/46 |
| 2020/0043258 A1* | 2/2020 | Jiang | G07C 5/085 |
| 2021/0073589 A1* | 3/2021 | Orhon | G06V 10/776 |
| 2021/0123835 A1* | 4/2021 | Glennon | H02J 50/001 |
| 2021/0192860 A1* | 6/2021 | Kale | G06N 3/08 |
| 2021/0215564 A1* | 7/2021 | Hong | G01M 15/12 |
| 2021/0250090 A1* | 8/2021 | Clarridge | H04W 4/38 |
| 2021/0335059 A1* | 10/2021 | Dixit | G05B 23/0254 |
| 2021/0373783 A1* | 12/2021 | Kim | G06F 3/0622 |
| 2021/0380076 A1* | 12/2021 | Davies | G05B 23/0283 |

OTHER PUBLICATIONS

Janssens et al. 2016, "Convolutional Neural Network Based Fault Detection for Rotating Machinery", Journal of Sound and Vibration, 377, pp. 331-345 (Year: 2016).*

Extended European Search Report and Written Opinion issued in European Patent Application No. 21170954.8, dated Oct. 27, 2021, in 11 pages.

Boukari Karima et al, A Parallel Multi-Classifiers System for Mechanical Fault Recognition, 2018 International Symposium on Advanced Electrical and Communication Technologies (ISAECT), IEEE, Nov. 21, 2018, pp. 1-6, DOI: 10.1109/ISAECT.2018. 8618783.

Sobie Cameron et al, Simulation-driven machine learning: Bearing fault classification, Mechanical Systems and Signal Processing, vol. 99, pp. 403-419, DOI: 10.1016/J.YMSSP.2017.06.025.

Janssens Olivier et al, Convolutional Neural Network Based Fault Detection for Rotating Machinery, Journal of Sound and Vibration, Elsevier, Amsterdam, NL, vol. 377, May 24, 2016, pp. 331-345, DOI: 10.1016/J.JSV.2016.05.027.

\* cited by examiner

FAULT DETECTION TECHNIQUE FOR A BEARING

CROSS-REFERENCE TO RELATED APPLICATIONS

This application claims the benefit of and priority to U.S. Provisional Application No. 63/025,565, filed on May 15, 2020.

BACKGROUND

In vehicles, particularly work vehicles such as agricultural vehicles and construction vehicles, a bearing failure can cause significant collateral damage to other components. No symptoms may be evident with a failing bearing. Accordingly, it may be impractical to discover a problem prior to failure. For example, manual inspection of the bearing is not a routine maintenance activity and is labor intensive.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation, a system is provided. The system includes a sensor configured to a signal indicative of a vibration within a component of a vehicle in operation. The system also includes a controller, which is configured to log vibration data corresponding to the signal received from the sensor, generate a first prediction of a health condition of the component with a first model based on the vibration data, generate a second prediction of the health condition of the component with a second model based on the vibration data, and output a health condition of the component based on the first prediction and the second prediction.

In another implementation, a method for a vehicle is provided. The method includes acquiring vibration data from a sensor associated with a component of the vehicle. The method also includes generating a first prediction of a health condition of the component with a first model based on the vibration data and generating a second prediction of the health condition of the component with a second model based on the vibration data. The method includes outputting the health condition of the component based on the first prediction and the second prediction.

In still another implementation, a non-transitory computer-readable storage medium having stored thereon computer-executable instructions is provided. The instructions, when executed by a processor, configure the processor to log vibration data from a sensor associated with a bearing of a hydrostatic motor. The instructions further configure the processor to generate a first prediction of a health condition of the bearing with a first model based on the vibration data and generate a second prediction of the health condition of the bearing with a second model based on the vibration data. The instructions further configure the processor to output the health condition of the bearing based on the first prediction and the second prediction.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

Various non-limiting implementations are further described in the detailed description given below with reference to the accompanying drawings, which are incorporated in and constitute a part of the specification.

DETAILED DESCRIPTION

Figure 1:
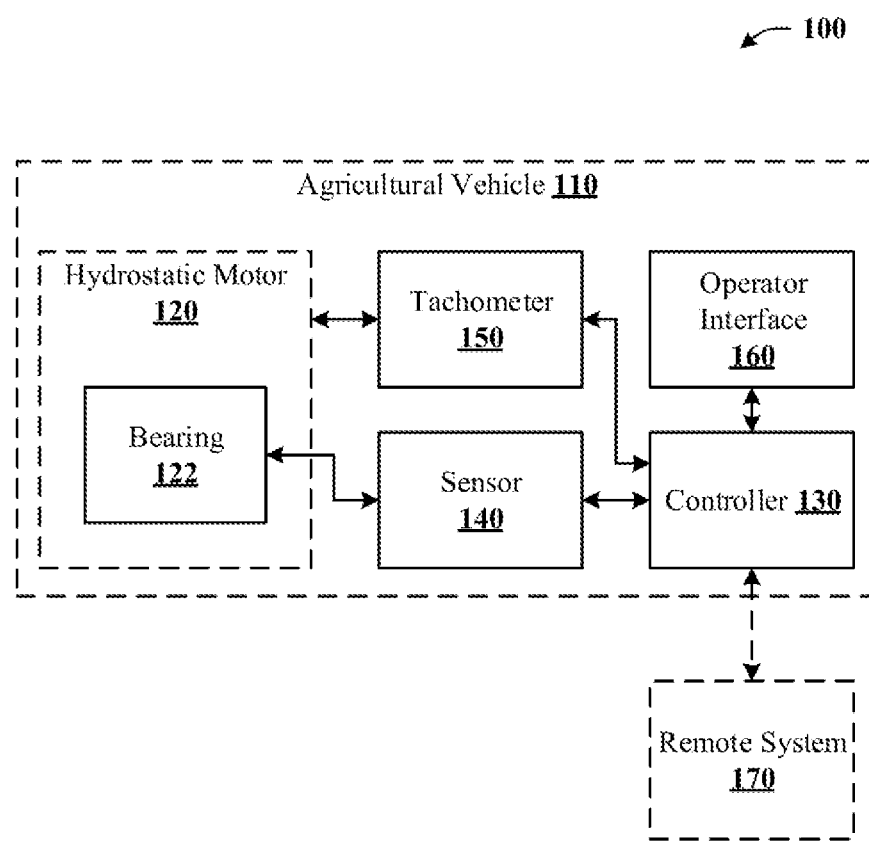
FIG. 1 illustrates an exemplary, non-limiting implementation of a fault detection system according to various aspects.

As described above, a fault in a bearing, in a machine for example, cannot be readily identified prior to a failure event, which may cause damage to other components. There are often no symptoms of the fault during operation of the machine. In accordance with various implementations, a fault detection technique is described that provides a preliminary indication of a potential fault prior to failure. This technique functions while the machine is in operation. A sensor outputs vibration data for a component, such as a bearing. A controller analyzes the vibration data to determine a condition of the bearing. In one aspect, the analysis involves utilizing one or more machine learning models to predict the condition of the bearing. The vibration data is regularly acquired and analyzed while the machine is operated. An operator may be alerted when a predicted condition of the bearing indicates a potential fault. Accordingly, the component may be inspected, repaired, and/or replaced prior to a catastrophic failure that causes collateral damage to other components thereby increasing repair costs and machine downtime.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Referring initially to FIG. 1, a fault detection system 100 is illustrated. The system 100 may be included in or utilized by an agricultural vehicle 110, such as a tractor, to monitor a component and identify a potential fault before a failure of the component occurs. According to an example, the monitored component can be a bearing 122 of a hydrostatic motor 120 of agricultural vehicle 110. While the exemplary implementation of FIG. 1 is described with respect to agricultural vehicle 110, it is to be appreciated the aspects described herein are applicable to other vehicles such as construction vehicles, or other machines having a bearing or other component similar to bearing 122 of hydrostatic motor, which may suffer similar faults.

A sensor 140 acquires vibration data associated with bearing 122 and streams the vibration data to a controller 130 for analysis to detect a potential fault. Controller 130 may include a microcontroller, a system-on-a-chip, an FPGA, or other logic circuitry. For instance, controller 130 may include a processor, a computer memory (e.g. a non-transitory computer-readable storage medium), and interfaces to acquire inputs and send signals to various components of system 100. The memory may include computer-executable instructions that configure the processor to carry out the functions of controller 130 in system 100. In some implementations, the controller 130 may be an electronic control unit such as an engine control unit (ECU) or the like. As such, the controller 130 may include a microcontroller, memory (e.g., SRAM, EEPROM, Flash, etc.), inputs (e.g., supply voltage, digital inputs, analog inputs), outputs (e.g., actuator inputs, logic outputs), communication interfaces (e.g., bus transceivers), and embedded software.

According to an example, controller 130 utilizes vibration data from sensor 140 to determine the health condition of bearing 122. The controller 130 may utilize one or more machine learning models to predict the health condition based on the vibration data acquired by sensor 140. For instance, according to one implementation, the controller 130 may utilize a first model and a second model that respectively predict health conditions of bearing 122 based on vibration data. The controller 130 may generate a hybrid condition of bearing 122 based in part on the two individual health predictions from the first model and the second model.

According to a further implementation, controller 130 may analyze the vibration data in dependence of the speed of the hydrostatic motor 120 (e.g. a rotational speed), which by extension is a speed associated with the bearing 122. In addition to vibration data, controller 130 may also acquire speed data from tachometer 150. The controller 130 may evaluate vibration data corresponding to a stable speed state of motor 120. In another example, vibration data may be weighted based on speed data. For instance, vibration data may provide a weaker signal at low speeds and a stronger signal at high speeds. At either extreme, a possibility of false negatives (i.e., failing to detect faults) or false positives (i.e., detecting faults that do not exist) can be reduced by compensating for effects of high or low speed on vibration data.

A determined health condition, particularly a negative condition (e.g. a condition indicative of damage, pending failure, or other fault in need of attention), can be output via an operator interface 160 (e.g. an in-cab indicator or display). In other examples, the health condition may be transmitted to a remote system 170 to support remote monitoring and/or logging of the condition of bearing 122.

Still further, as described later, there may be temporal or speed dependencies for the predicted health condition. Accordingly, the output via the operator interface 160 may not be an instantaneous output of a prediction, but rather a processed output to account for time or speed conditions. For example, a temporal fusion of the predicted health condition over time may be applied before output is provided via operator interface 160. In another implementation, a time average or a sliding window is utilized to smooth output over time.

Figure 2:
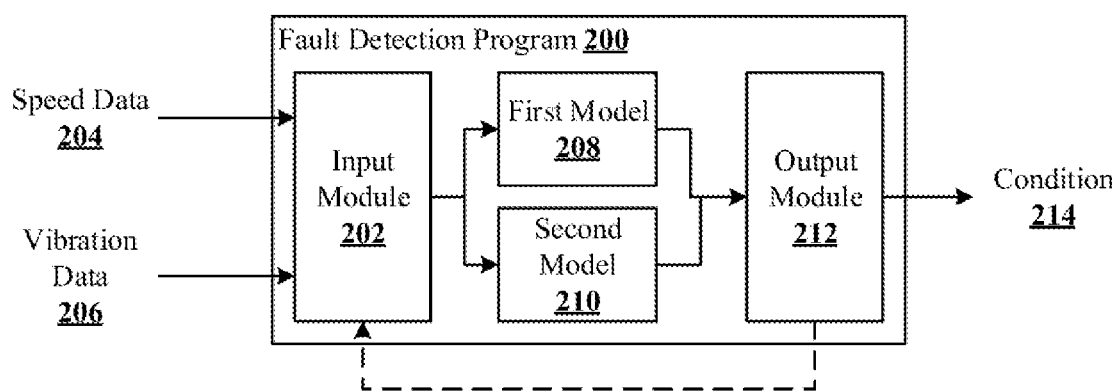
FIG. 2 illustrates an exemplary, non-limiting implementation of a fault detection program utilized by the fault detection system of FIG. 1.

Turning to FIG. 2, an exemplary implementation of a fault detection program 200 is illustrated. Fault detection program 200 may be implemented by computer-executable instructions executed by controller 130. It is to be appreciated, however, that fault detection program 200 may be executed remotely from the agricultural vehicle 110. For instance, speed and/or vibration data acquired at the agricultural vehicle 110 may be transmitted to another computing device (e.g. remote system 170, a mobile device, or other computer separate from vehicle 110) for analysis.

As shown in FIG. 2, fault detection program 200 includes an input module 202 that obtains speed data 204 and vibration data 206. According to an example, input module 202 may log speed data 204 and vibration data 206 for a configurable period of time, T, at intervals, Q, where T and Q are parameters having time-based units such as seconds. In other words, input module 202 may log data for T seconds every Q seconds.

In another aspect, input module 202 may process the data for analysis. For example, input module 202 can detect a stable speed state of agricultural vehicle 110 based on speed data 204 and select a portion of vibration data 204 corresponding to the stable speed state for further analysis. That portion of vibration data 204 is evaluated by a first model 208 and a second model 210. The first model 208 and the second model 210 respectively output a condition of a component (e.g. bearing 122) based on the portion of vibration data 204. In one example, the first model 208 may be a convolutional neural network and the second model 210 may be a threshold model. However, it is to be appreciated that alternative learning models may be utilized to provide independent determinations of the condition based on vibration data 204.

The individual determinations by first model 208 and second model 210 may be combined and provided to output module 212, which generates condition 214 output to a computing device (e.g. remote system, mobile device, etc.) or to an operator interface (e.g. in-cab display or indicator). Further, the output module 212 may refine the combined condition determination based on temporal and/or speed dependencies. The output module 212, depending on the condition determined, may provide feedback to input module 202 to alter data collection. For instance, data may be logged more frequently if a deteriorating condition is detected.

Figure 3:
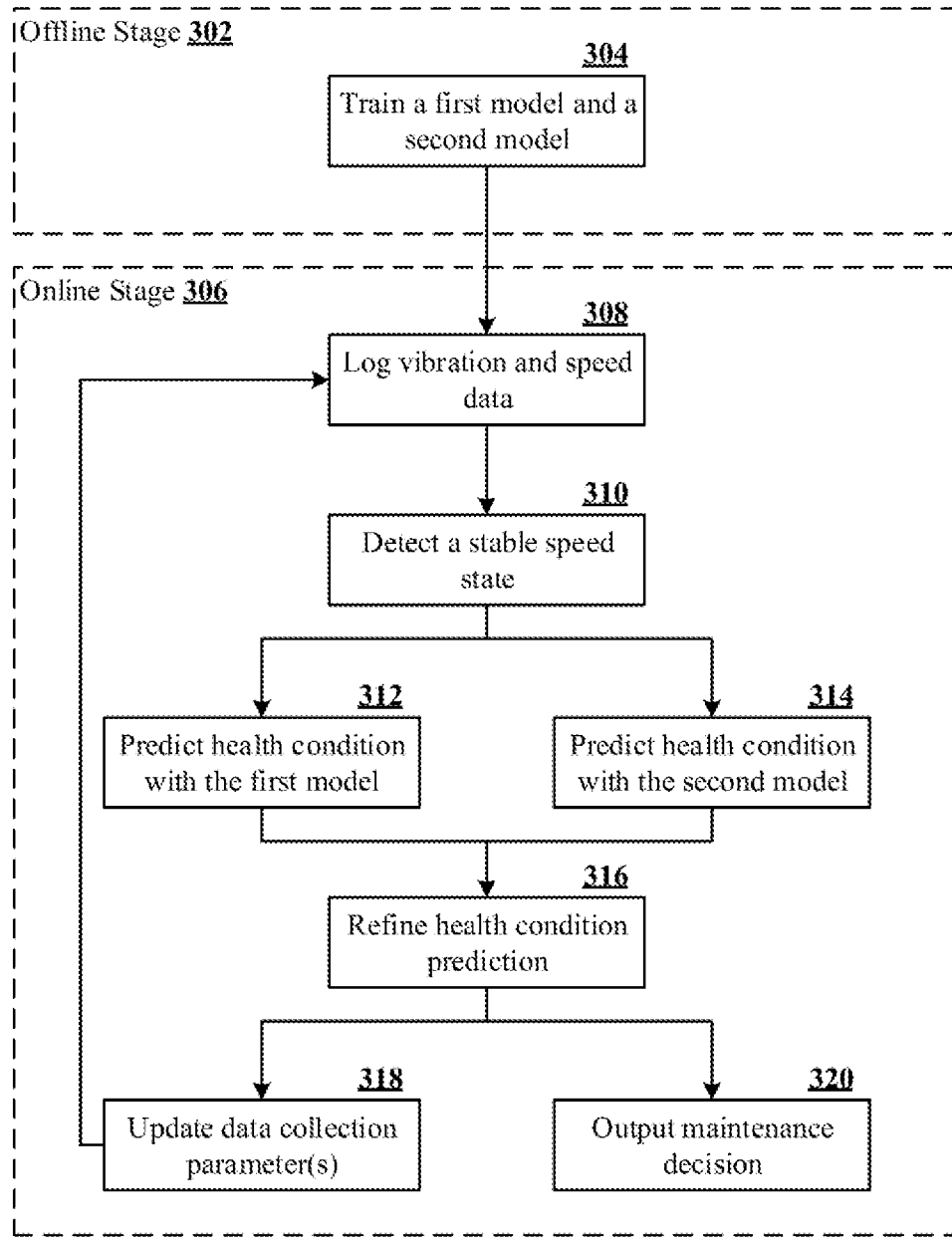
FIG. 3 illustrates an exemplary, non-limiting implementation of a fault detection method according to various aspects.

FIG. 3 illustrates a fault detection method 300, which may be implemented by system 100 and/or program 200. As shown in FIG. 3, method 300 includes two stages—an offline stage 302 and an online stage 306. The offline stage 302 may occur prior to deployment of the system 100 and/or program 200 in agricultural vehicle 110. The online stage 306, for example, may be carried out during the operation of the agricultural vehicle 110.

In the offline stage 302, at step 304, a first model and a second model are trained. The training process is described in greater detail below, but a result of this process includes trained first and second models capable of predicting the health condition based on vibration data.

After the models are trained, the online stage 306 of method 300 can be carried out. The online stage 306 may begin at step 308 where vibration and speed data is logged. In an example, logging may occur for T seconds in each interval, where an interval is Q seconds. The parameter Q may depend on a computational performance of a controller (e.g. controller 130) and/or a health condition of a bearing (e.g. determined in a prior iteration).

At 310, a stable speed detection step occurs. In some instances, vibration data may have more predictive ability when the agricultural vehicle is in a stable speed state. In one example, the speed and vibration data collected in step 306 may be divided into two subsets. In some examples, the two subsets may be of equal size. A mean speed for each subset is determined and an absolute value of a difference therebetween is compared to a threshold. If the difference is below the threshold, a stable speed state is detected and processing may continue. In some examples, further processing may be conducted with one of the two subsets, or the entire set may be utilized. In addition, an average of the vibration data may be calculated to verify a connection to the sensor. For instance, a zero average may indicate a problem with the sensor.

Figure 8:
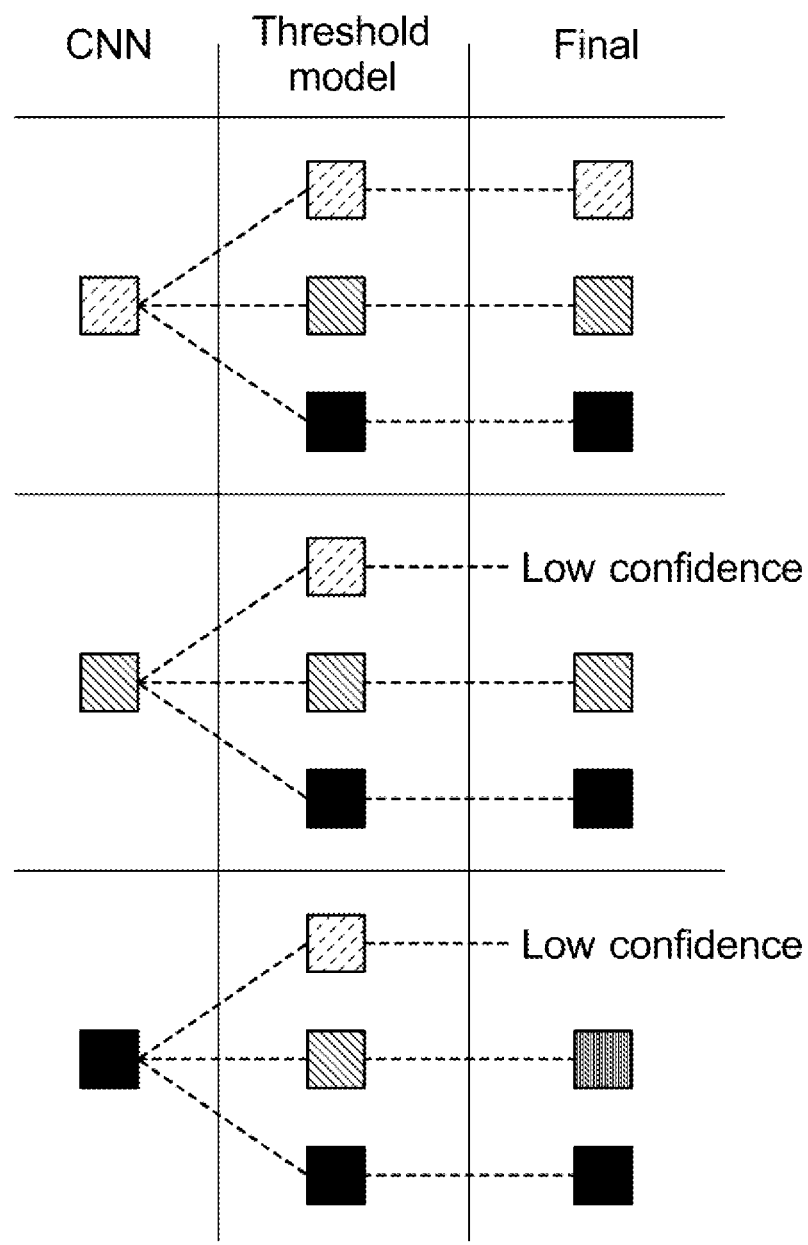
FIG. 8 illustrates an exemplary, non-limiting implementation of a rule set to determine a health condition based on individual predictions from at least two models.

After detecting a stable speed and verifying vibration data, a health condition can be determined. At step 312, the first model is employed to determine a first prediction based on the vibration data. At 314, which may occur in parallel to step 312, the second model is employed to determine a second prediction based on the vibration data. The first and second predictions can be combined to determine a health condition. For example, when the first and second predictions indicate no damage, then the combined health condition is also no damage. In another example, the first model may be a convolutional neural network and the second model may be a threshold model. According to this example, a low confidence situation may occur when the convolutional neural network indicates a condition other than no damage, but the threshold model indicates no damage. In this circumstance, the combined health condition can be output as the condition predicted by the convolution neural network, but with a low confidence disclaimer. Finally, in other permutations, the combined health condition can be a worst case between the first prediction and the second prediction. FIG. 8 graphically illustrates exemplary rules for combining the predictions as described above.

After a combined health condition is determined, the condition may be refined at step 316. For instance, a health condition may be refined based on observations of a temporal and/or speed dependency of the health condition. A rapid change of a health condition prediction over time is not physically meaningful and, generally, predictions that are more recent are more relevant. Accordingly, a temporal fusion technique can be applied to refine the health condition such that predictions that are more recent are given more weight. Mathematically, this technique can be represented by the following:

$$f(\Delta t, \sigma_1) = \left(\frac{\sqrt{2}}{\sigma_1 \sqrt{\pi}}\right)^{-\frac{\Delta t^2}{2\sigma_1^2}}$$

Further, it has been observed that vibration data at low speeds may provide a weak signature, which may lead to missed detections. At high speeds, the vibration data may provide a strong signature leading to false positives. Accordingly, the health condition may be refined to allocate a greater weight to vibration data that corresponds to a speed closer to a mean speed. Mathematically, this relationship can be represented by the following $$f(\Delta V, \sigma_2, \beta) = \left(\frac{\beta}{2\sigma_2 \Gamma(1/\beta)}\right)^{-\frac{|\Delta V|^2}{\sigma_2^2}}$$

$$\Delta V = V(t + \Delta t) - V_{mean}$$

$V(t + \Delta t)$: speed at time step $t + \Delta t$

After refinement, a maintenance decision may be output at 320 based on the health condition. For example, if light damage is predicted, replacement of the part may be scheduled soon. If heavy damage is predicted, the vehicle may be removed from service and repaired immediately. In addition, the health condition may be output to an operator via an operator interface as described above. To avoid a rapidly changing output to the operator, the operator interface may indicate the health condition after refinement instead of an instantaneous prediction.

In addition, at step 318, data collection parameters may be updated. For example, the parameter Q may be modified based on a predicted health condition. If a change from no damage to light damage is detected, more frequent data collection may occur.

Figure 4:
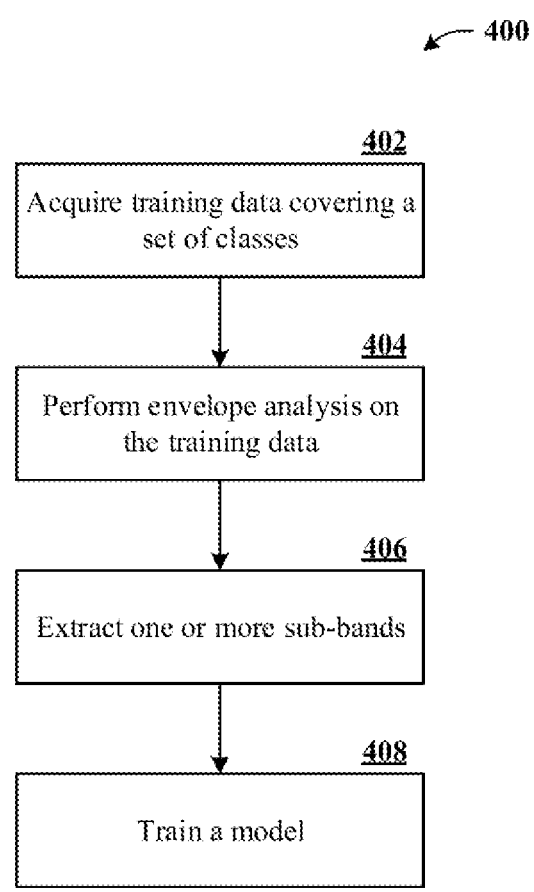
FIG. 4 illustrates an exemplary, non-limiting implementation of a method for training a model for use in the fault detection method of FIG. 3 or by the fault detection system of FIG. 1.

Turning to FIG. 4, a training method 400 for a model employable in the fault detection method of FIG. 3, the fault detection program of FIG. 2, or the fault detection system of FIG. 1 is depicted. At 402, training data covering a set of classes is acquired. In an example, the training data may include vibration data corresponding to bearings having conditions matching prediction classes to be output by the model. For instance, the classes may include no damage, light damage, and heavy damage.

Figure 7:
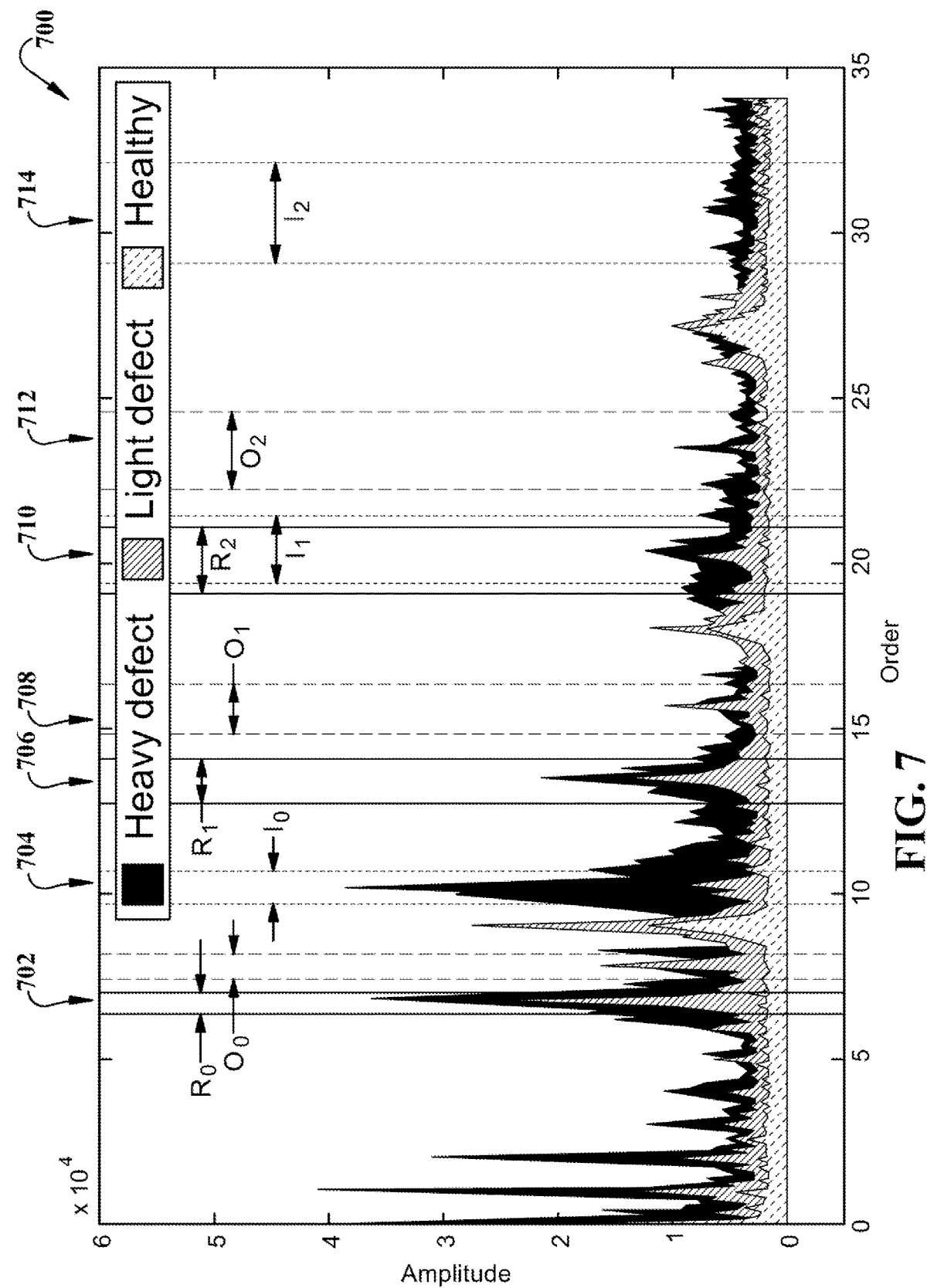
FIG. 7 illustrates an exemplary, non-limiting implementation of envelope spectra for vibration data associated with bearings in accordance with various aspects.

At step 404, an envelope analysis is performed on the training data to generate respective envelope spectra for the training classes. Referring briefly to FIG. 7, an exemplary envelope spectrum 700 is shown. At 406, one or more sub-bands are extracted from the envelope spectrum. For example, the sub-bands may correspond to a predefined number of frequency sub-bands centered at fault characteristic frequencies and harmonics. Referring again to FIG. 7, sub-bands 702-714 are extracted from envelope spectrum 700. At 408, vibration data (e.g. vibration amplitudes) within the extracted sub-bands are fed as input to a model for training.

Figure 5:
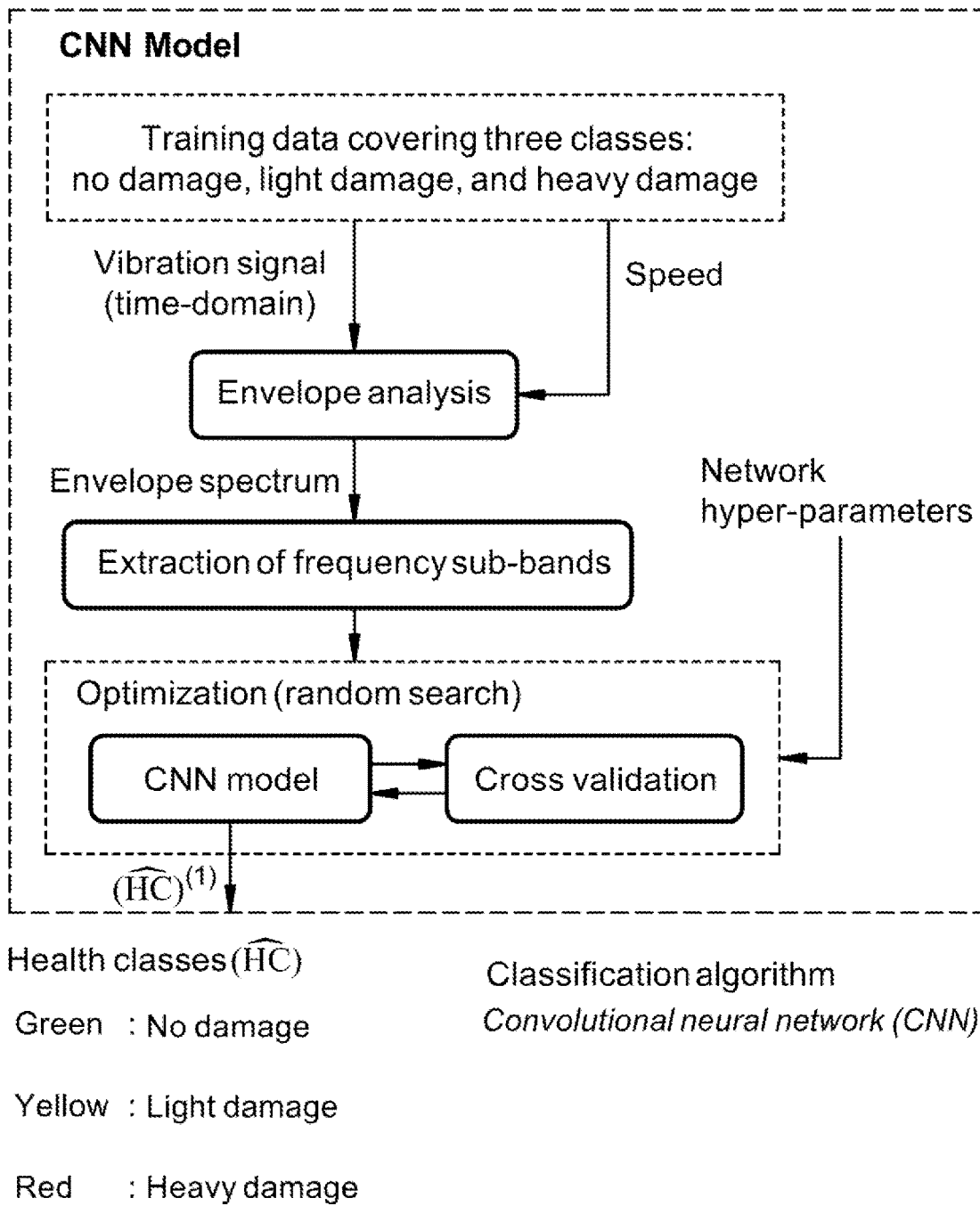
FIG. 5 illustrates an exemplary, non-limiting implementation of training a convolutional neural network in accordance with an aspect.

Turning to FIG. 5, illustrated is an exemplary process for training a convolutional neural network (CNN). As shown in FIG. 5, the training process involves acquiring training data, performing an envelope analysis, and extracting characteristic sub-bands. With the training data, the CNN may be established according to a given set of network hyperparameters and then trained. The trained CNN may be tested with a validation dataset (e.g. via cross-validation). The hyperparameters may be tuned and/or optimized by iterations of the process until a desired performance is achieved. After training, the CNN may be deployed to process vibration data in near real-time from an operating motor.

Figure 6:
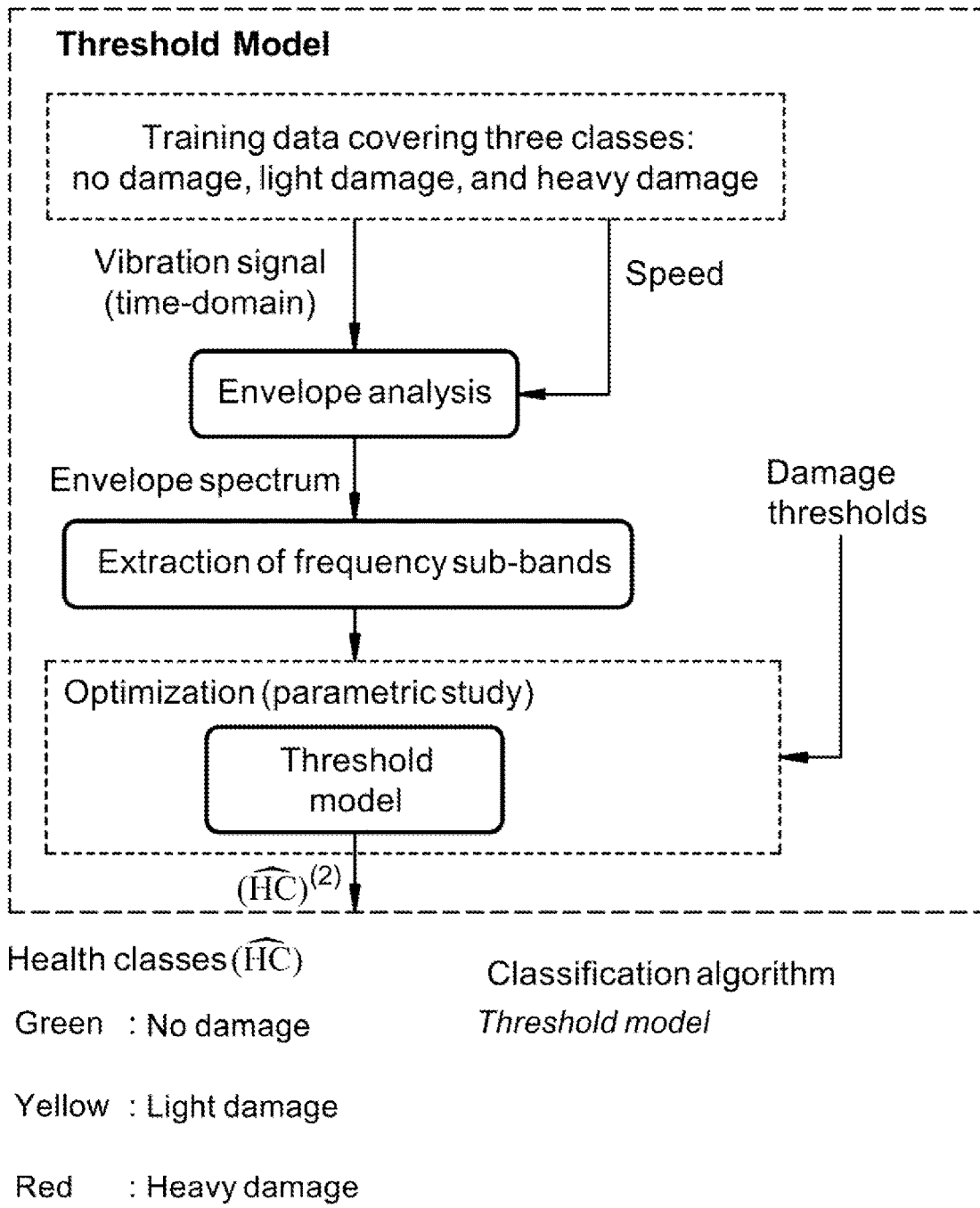
FIG. 6 illustrates an exemplary, non-limiting implementation of training a threshold model in accordance with an aspect.

FIG. 6 illustrates an exemplary process for training a threshold model. As shown in FIG. 6, the training process involves acquiring training data, performing an envelope analysis, and extracting characteristic sub-bands. Subsequently, a parameter study is performed to identify one or more thresholds in the underlying data, depending on a number of classes in an output set. For instance, with three classes in the output set (e.g. no damage, light damage, and heavy damage), two thresholds may be established during training. A first threshold marks a transition between no damage and light damage. A second threshold indicates a change from light damage to heavy damage.

In accordance with an implementation, a system is described herein that includes a sensor configured to a signal indicative of a vibration within a component of vehicle in operation. The system further includes a controller. The controller is configured to: log vibration data corresponding to the signal received from the sensor; generate a first prediction of a health condition of the component with a first model based on the vibration data; generate a second prediction of the health condition of the component with a second model based on the vibration data; and output the health condition of the component based on the first prediction and the second prediction.

According to various examples, the first model is a convolutional neural network, the second model is a threshold model, and the component is a bearing of a hydrostatic motor. Moreover, the controller is further configured to acquire a speed signal indicative of a speed associated with the component and log speed data based on the speed signal together with the vibration data. In another example, the controller is further configured to analyze the speed data to detect a stable speed state, select a portion of the vibration data corresponding to the stable speed state, and process the portion of the vibration data selected with the first and second models. In another example, the controller is further configured to refine the health condition of the component according to at least one of a temporal dependency or a speed dependency of the vibration data. In yet another example, the controller is further configured to: acquire training data; generate an envelope spectrum based on the training data; extract one or more frequency sub-bands from the envelope spectrum, the one or more frequency sub-band being characteristic frequencies of faults; train the first model with input training data corresponding to the one or more frequency sub-bands; and train the second model with the input training data corresponding to the one or more frequency sub-bands. Still further, the controller can be configured to modify logging of vibration data based on the health condition output.

According to another implementation, a method for a vehicle is described. The method may include acquiring vibration data from a sensor associated with a component of the vehicle. The method may also include generating a first prediction of a health condition of the component with a first model based on the vibration data. Further, the method may include generating a second prediction of the health condition of the component with a second model based on the vibration data. The method may further include outputting the health condition of the component based on the first prediction and the second prediction.

In various example of the method, the first model is a convolutional neural network and the second model is a threshold model. The method may also include acquiring speed data associated with the component, determining a stable speed state of the component based on the speed data, selecting a portion of the vibration data corresponding to the stable speed state, and processing the portion of the vibration data selected with the first and second models. Moreover, the method can include refining the health condition of the component according to at least one of a temporal dependency or a speed dependency of the vibration data. Still further, the method may also include acquiring training data; generating an envelope spectrum based on the training data; identifying one or more sub-bands from the envelope spectrum that are relevant for fault detection; training the first model with portions of the training data corresponding to the one or more sub-bands identified; and training the second model with the portions of the training data corresponding to the one or more sub-bands identified.

In yet another implementation, a non-transitory, computer-readable storage medium is described. The computer-readable storage medium stores computer-executable instructions that, when executed by a processor, configure the processor to: log vibration data from a sensor associated with a bearing of a hydrostatic motor; generate a first prediction of a health condition of the bearing with a first model based on the vibration data; generate a second prediction of the health condition of the bearing with a second model based on the vibration data; and output the health condition of the bearing based on the first prediction and the second prediction.

According to various examples, the first model is a convolutional neural network and the second model is a threshold model. The computer-readable storage medium may also store instructions that configure the processor to: acquire speed data associated with a rotational speed of the hydrostatic motor; and log the speed data together with the vibration data. The computer-readable storage medium can further store instructions that configure the processor to: analyze the speed data to detect a stable speed state of the hydrostatic motor; select a portion of the vibration data corresponding to the stable speed state; and process the portion of the vibration data selected with the first and second models.

According to further examples, the computer-readable storage medium may store instructions that configure the processor to refine the health condition of the bearing according to at least one of a temporal dependency or a speed dependency of the vibration data. The medium can further store instructions that configure the processor to: acquire training data; generate an envelope spectrum based on the training data; identify one or more sub-bands from envelope spectrum indicative of faults in the bearing; train the first model with portions of the training data corresponding to the one or more sub-bands identified; and train the second model with portions of the training data corresponding to the one or more sub-bands identified. The computer-readable medium can further store computer-executable instructions that configure the processor to modify logging of vibration data based on the health condition output.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such features may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

The invention claimed is:

1. A system, comprising:
    a vehicle having:
        a component with a bearing;
        a sensor associated with the bearing and configured to output a signal indicative of a vibration of the bearing of the component while the vehicle is in operation; and
        a tachometer associated with the component and configured to output a signal indicative of a speed of the bearing while the vehicle is in operation; and
    a controller configured to:
        log vibration data for the bearing corresponding to the signal received from the sensor;
        log speed data associated with the bearing corresponding to the signal received from the tachometer;
        generate a first prediction of a health condition of the bearing with a first model based on the vibration data;
        generate a second prediction of the health condition of the bearing with a second model based on the vibration data;
        determine the health condition of the bearing based on the first prediction and the second prediction;
        refine the health condition of the bearing according to a weighting of the health condition determined based on a speed dependency of the vibration data utilizing the speed data; and
        output a maintenance decision for the vehicle based on the refined health condition of the bearing,
    wherein the refined health condition of the bearing indicates one of no damage or damage, and wherein the maintenance decision is one of removing the vehicle from service for immediate repair of the bearing or scheduling replacement of the bearing while the vehicle remains in service when the refined health condition indicates damage.

2. The system of claim 1, wherein the first model is a convolutional neural network and the second model is a threshold model.

3. The system of claim 1, wherein the component having the bearing is a hydrostatic motor.

4. The system of claim 1, wherein the controller is further configured to:
    acquire a speed signal from the tachometer indicative of a speed associated with the component; and
    log the speed data based on the speed signal together with the vibration data.

5. The system of claim 1, wherein the controller is further configured to:
    analyze the speed data to detect a stable speed state, wherein the stable speed state corresponds to a portion of the speed data having a speed within a threshold distance from a mean speed;
    select a portion of the vibration data corresponding to the stable speed state; and
    process the portion of the vibration data selected with the first and second models.

6. The system of claim 1, wherein the controller is further configured to:
    acquire training data;
    generate an envelope spectrum based on the training data;
    extract one or more frequency sub-bands from the envelope spectrum, the one or more frequency sub-band being characteristic frequencies of faults;
    train the first model with input training data corresponding to the one or more frequency sub-bands; and
    train the second model with the input training data corresponding to the one or more frequency sub-bands.

7. The system of claim 1, wherein the controller is further configured to modify logging of vibration data based on the health condition output.

8. A method for a vehicle, comprising:
    acquiring vibration data from a sensor associated with a bearing of a component of the vehicle while the vehicle is in operation;
    acquiring speed data from a tachometer associated with the component, the speed data further being indicative of a speed of the bearing while the vehicle is in operation;
    determining a stable speed state of the component based on the speed data, wherein the stable speed state corresponds to a portion of the speed data having a speed within a threshold distance from a mean speed;
    selecting a portion of the vibration data corresponding to the stable speed state;
    generating a first prediction of a health condition of the bearing with a first model based on the portion of the vibration data selected based on the speed data;

generating a second prediction of the health condition of the bearing with a second model based on the portion of the vibration data selected based on the speed data; and outputting a maintenance decision for the vehicle based on the health condition of the bearing based on the first prediction and the second prediction, wherein the maintenance decision includes removing the vehicle from service or scheduling replacement of the bearing when the health condition of the bearing indicates damage.

9. The method of claim 8, wherein the first model is a convolutional neural network and the second model is a threshold model.

10. The method of claim 8, further comprising refining the health condition of the component according to at least one of a temporal dependency or a speed dependency of the vibration data.

11. The method of claim 8, further comprising:
acquiring training data;
generating an envelope spectrum based on the training data;
identifying one or more sub-bands from the envelope spectrum that are relevant for fault detection;
training the first model with portions of the training data corresponding to the one or more sub-bands identified; and
training the second model with the portions of the training data corresponding to the one or more sub-bands identified.

12. A non-transitory, computer-readable storage medium having stored thereon computer-executable instructions that, when executed by a processor, configure the processor to:
log vibration data from a sensor associated with a bearing of a hydrostatic motor of a vehicle while the vehicle is in operation;
generate a first prediction of a health condition of the bearing with a first model based on the vibration data;
generate a second prediction of the health condition of the bearing with a second model based on the vibration data;
output a maintenance decision for the vehicle based on the health condition of the bearing based on the first prediction and the second prediction, wherein the maintenance decision can include removing the vehicle from service or scheduling replacement of the bearing; and
modify logging of vibration data based on the health condition of the bearing, wherein a frequency of collecting vibration data changes responsive to the health condition of the bearing.

13. The non-transitory, computer-readable medium of claim 12, wherein the first model is a convolutional neural network and the second model is a threshold model.

14. The non-transitory, computer-readable medium of claim 12, further storing computer-executable instructions that configure the processor to:
acquire speed data associated with a rotational speed of the hydrostatic motor; and
log the speed data together with the vibration data.

15. The non-transitory, computer-readable medium of claim 14, further storing computer-executable instructions that configure the processor to:
analyze the speed data to detect a stable speed state of the hydrostatic motor, wherein the stable speed state corresponds to a portion of the speed data having a speed within a threshold distance from a mean speed;
select a portion of the vibration data corresponding to the stable speed state; and
process the portion of the vibration data selected with the first and second models.

16. The non-transitory, computer-readable medium of claim 12, further storing computer-executable instructions that configure the processor to refine the health condition of the bearing according to at least one of a temporal dependency or a speed dependency of the vibration data.

17. The non-transitory, computer-readable medium of claim 12, further storing computer-executable instructions that configure the processor to:
acquire training data;
generate an envelope spectrum based on the training data;
identify one or more sub-bands from envelope spectrum indicative of faults in the bearing;
train the first model with portions of the training data corresponding to the one or more sub-bands identified; and
train the second model with the portions of the training data corresponding to the one or more sub-bands identified.

* * * * *